Figure 1:
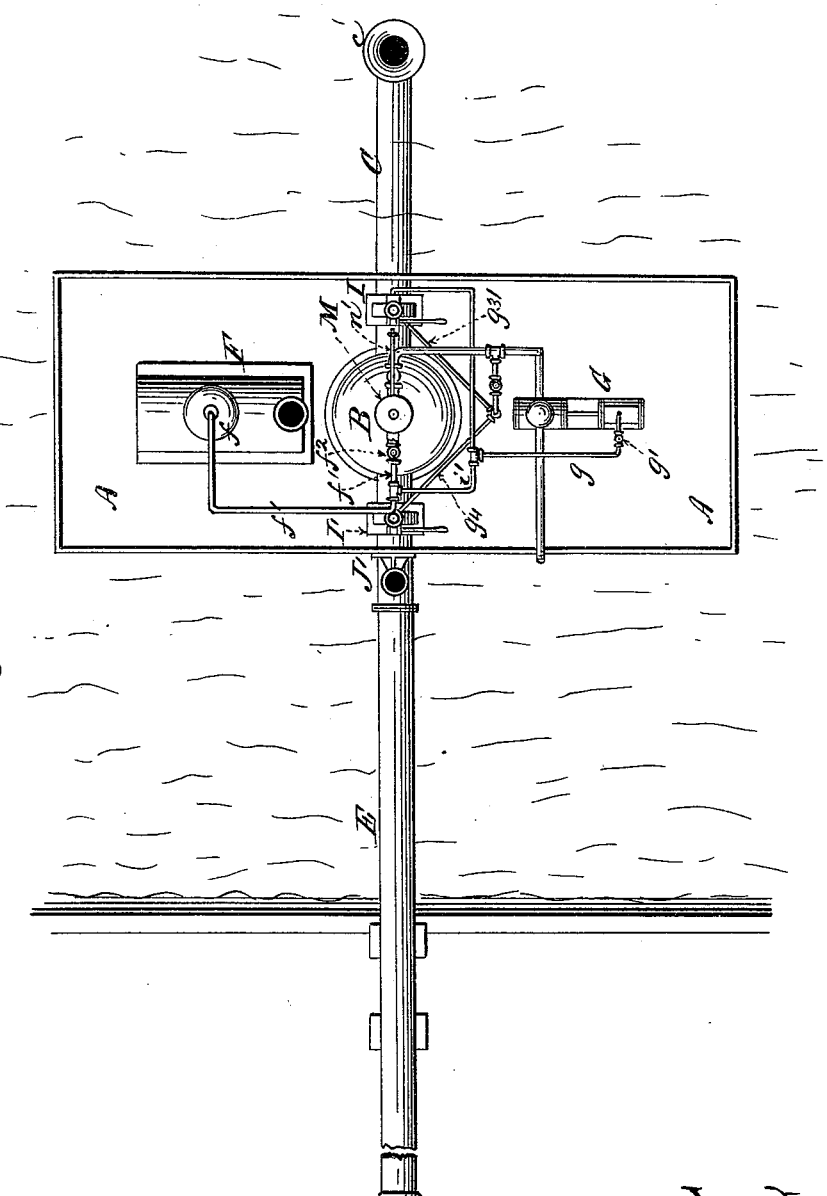

(No Model.) 4 Sheets—Sheet 1.
C. G. COLLINS, A. C. HILSINGER & C. A. STEVENS.
DREDGING APPARATUS.

No. 544,460. Patented Aug. 13, 1895.

(No Model.) 4 Sheets—Sheet 3.
C. G. COLLINS, A. C. HILSINGER & C. A. STEVENS.
DREDGING APPARATUS.
No. 544,460. Patented Aug. 13, 1895.

(No Model.) 4 Sheets—Sheet 4.

C. G. COLLINS, A. C. HILSINGER & C. A. STEVENS.
DREDGING APPARATUS.

No. 544,460. Patented Aug. 13, 1895.

Witnesses:
Edith Miatt
D. W. Gardner

Inventors:
Caleb G. Collins,
Albertis C. Hilsinger,
Calvin Amory Stevens
By their attorney George William Miatt

United States Patent Office.

CALEB G. COLLINS, OF WOODBURY, ALBURTIS C. HILSINGER, OF KILLAWOG, AND CALVIN AMORY STEVENS, OF NEW YORK, N. Y.; SAID COLLINS AND HILSINGER ASSIGNORS TO SAID STEVENS.

DREDGING APPARATUS.

SPECIFICATION forming part of Letters Patent No. 544,460, dated August 13, 1895.

Application filed March 4, 1895. Serial No. 540,565. (No model.)

*To all whom it may concern:*

Be it known that we, CALEB G. COLLINS, of Woodbury, in the county of Queens, ALBURTIS C. HILSINGER, of Killawog, in the county of Broome, and CALVIN AMORY STEVENS, of the city and county of New York, State of New York, citizens of the United States, have invented certain new and useful Improvements in Dredging Apparatus, of which the following is a specification.

Our improvements relate to the class of apparatus in which vaccum-chambers are used in excavating and transferring the spoil in connection with water acting as a vehicle.

The invention is designed, first, to obviate the severe strain and danger of fracture to which the parts are subjected in operation, owing to the impetus imparted to the spoil under the action of the vacuum, resulting frequently in fracture or derangement of the apparatus.

The invention is designed, secondly, to effect a more economical use than heretofore of steam within the vacuum-chamber by lessening or preventing its direct contact with the water which acts as a liquid vehicle for the spoil.

The first feature of our invention is the result of investigation and experiment resorted to in order to ascertain and counteract the cause of certain irregularities in the action of the vacuum apparatus, which resulted frequently in fracture and delay. We have ascertained that where the spoil is very much diluted the fractional resistance to its passage through the suction-pipe is so slight that the spoil and water acquire a dangerous momentum in rushing in to fill the vacuum-chamber, sufficient in some cases to rupture the apparatus. Ordinarily the resistance afforded by the sides of the suction-pipe to the passage of the spoil is sufficient to retard its speed of passage within safe limits, so that a majority of the charges will enter the vacuum-chamber without undue violence; but from the variable nature of the feed or supply of spoil to the suction-pipe certain charges will unavoidably contain a greater proportion of water than others, there being no convenient way of ascertaining and regulating the character of each charge. In a similar manner and under like conditions of spoil, &c., the momentum acquired by the latter during its discharge before a pressure of steam is apt to create a dangerous reaction or "kick," and even to create a partial vacuum in the discharge-pipe after the discharge-gate is closed and occasion the possible collapse of a part of the apparatus. We obviate all danger to the apparatus from these causes, first, by constructing the upper part of the vacuum-chamber with a pressure relief-valve which yields automatically whenever the velocity acquired by the spoil exceeds a degree of safety to which the relief-valve is set, the opening of the valve relieving the upper part of the vacuum-chamber from undue impact and strain, and, secondly, by forming the discharge-passage beyond the exit-gate with a vacuum-relieving device which acts automatically.

In the use of the vacuum-chamber a partial vacuum is first produced by admitting steam and spraying it with water, when the inlet-gate is opened and the charge of mingled spoil and water rushes into the chamber. The inlet-gate is then closed, the outlet-gate opened, and the charge ejected by the pressure of live steam admitted above the charge. We provide the vacuum-chamber with a loose diaphragm or piston-float, which virtually divides the vacuum-chamber into two compartments during actual use, the diaphragm floating upon the top of the liquid or semi-liquid charge of spoil and protecting the latter from direct contact with the live steam admitted above to effect the expulsion of the charge. As a result the full expansive force of nearly the whole volume of steam admitted is utilized in work, and there is little or loss from condensation or absorption of steam.

In the accompanying drawings we illustrate diagrammatically and in detail the essential features of our invention.

The apparatus may be modified more or less in construction and arrangement of parts without deviating from the spirit and intent of the invention, however, and we do not confine ourselves strictly to the identical form and arrangement of parts shown. For instance, the vacuum-chamber is illustrated as situated mainly below the water-line in a caisson, whereas it may be situated and arranged as indicated in either of the Patents No. 496,342, No. 512,862, or No. 501,870, and in like manner the several parts may be adapted and arranged as desired or to meet requirements of special circumstances of use.

Figure 2:
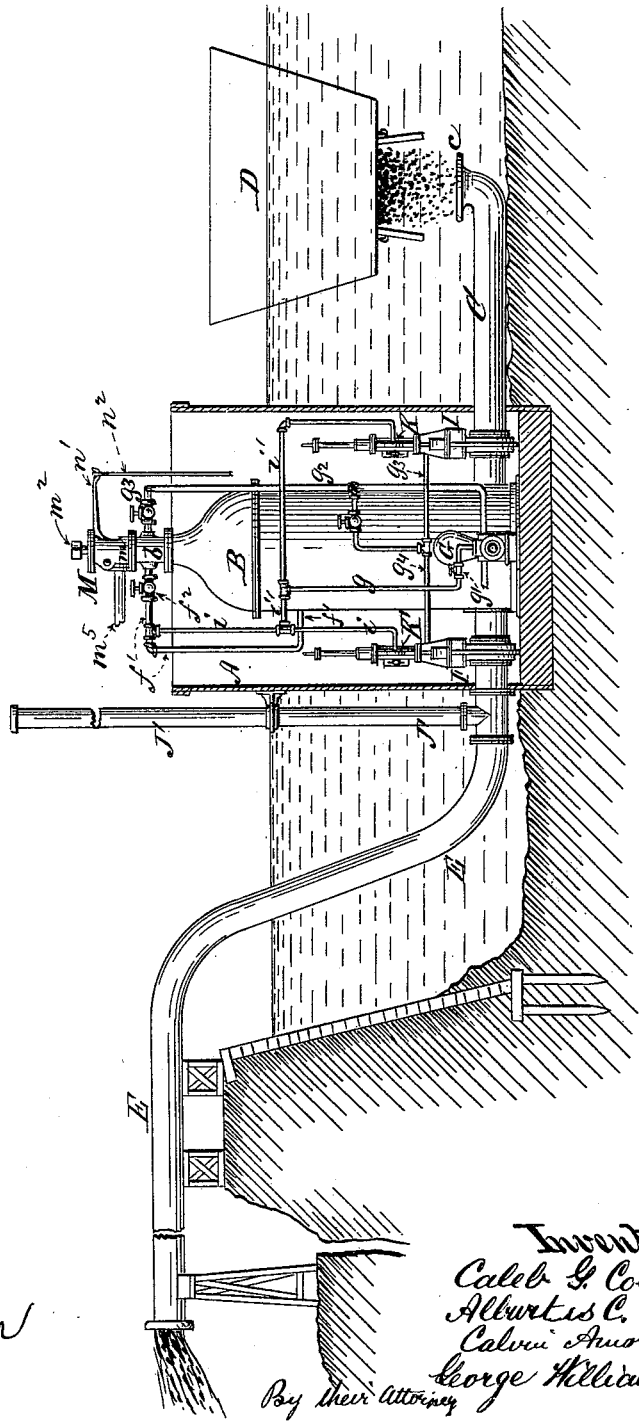
Figure 3:
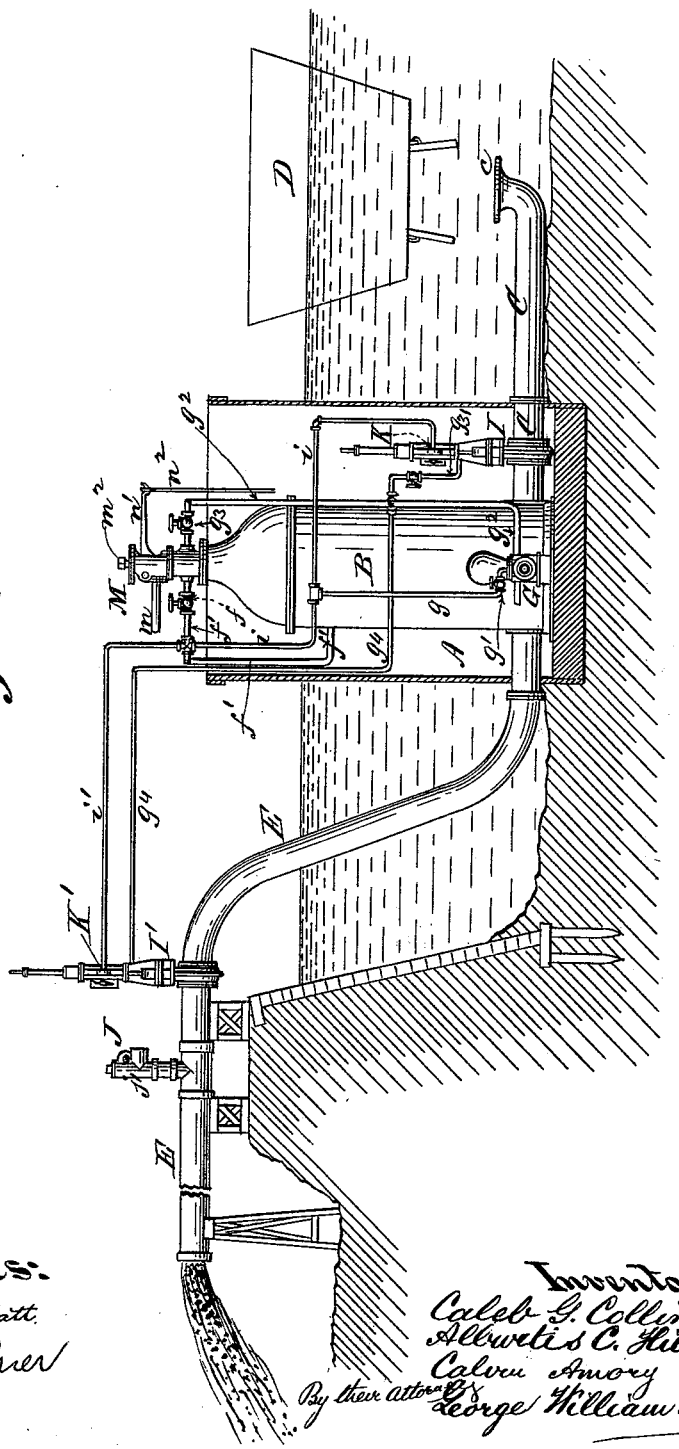
Figure 4:
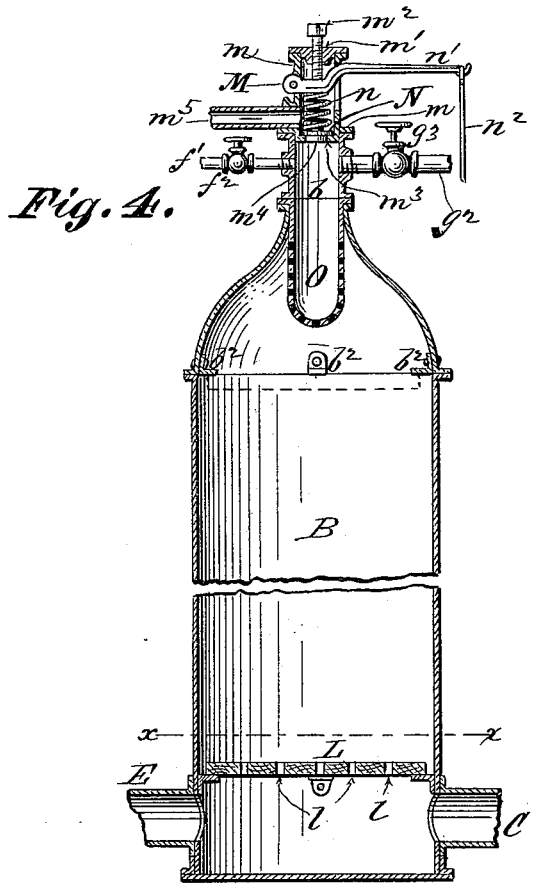
Figure 5:
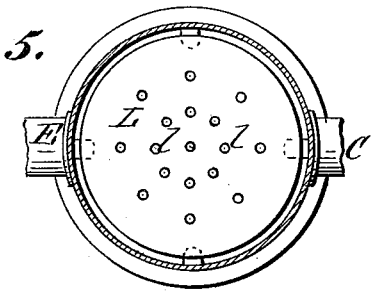
Figure 6:
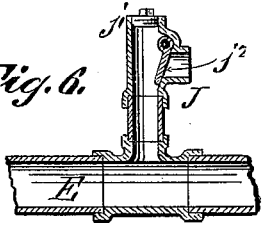
Figure 7:
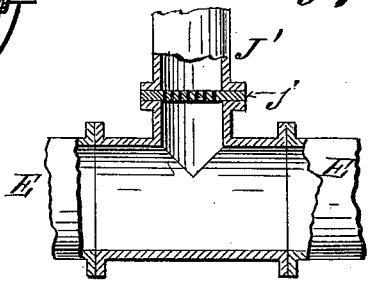

In the accompanying drawings, Figure 1 is a plan illustrating diagrammatically the arrangement of apparatus suitable for carrying out our improvements. Fig. 2 is a vertical section of a caisson and surroundings, showing the apparatus in elevation. Fig. 3 is a view similar to Fig. 2, showing a modification in the arrangement of the parts. Fig. 4 is a sectional elevation of the vacuum-chamber. Fig. 5 is a transverse section thereof upon plane of line $x$ $x$, Fig. 4. Fig. 6 is a sectional elevation of a form of relief-valve suitable for use in connection with the discharge-pipe; Fig. 7, a section of the lower end of a stand-pipe, showing perforated diaphragm used when a stand-pipe is substituted for the relief-valve shown in Fig. 6.

The caisson A is of any ordinary or suitable construction, and is sunk and maintained in position in the usual way.

B is the vacuum-cylinder, situated in and resting upon the bottom of the caisson, so that its receiving or suction pipe C, extending out horizontally from the bottom of the cylinder and from the side of the caisson, is submerged sufficiently below the water-line to permit dumping-scows D to pass over and above its mouth $c$. The discharge-pipe E extends upward from the opposite side of the cylinder and of the caisson to a point at which it is desired to distribute the spoil.

In the drawings the source of steam-supply is represented symbolically as derived from a steam-boiler F, situated within the caisson, although any other source of steam-supply may be employed as may be found most expedient in practice.

I and I' are respectively the inlet and outlet steam-valves.

J and J' are alternative forms of a relief device for the discharge-conduit.

G is a symbolical representation of a steam-pump employed to afford the requisite supply and pressure of water to certain parts of the apparatus, as hereinafter set forth.

The main steam-supply pipe $f'$ extends from the steam-dome $f$ of the steam-boiler F to the cylindrical chamber $b$ upon the top of the vacuum-chamber, a suitable valve $f^2$ being interposed in its length. A branch pipe $i'$ extends from the main steam-pipe $f'$ to the throttle-valve K' of the vacuum-cylinder steam gate-valve I'. Another branch pipe $i$ conveys steam from the main pipe $f'$ to the steam-pipe $g$, which supplies steam through the valve $g'$ to the pump G and to the throttle-valve K of the vacuum-chamber inlet steam gate-valve I. The steam-pump G supplies water under pressure through the pipe $g^2$ and valve $g^3$ to the compartment $b$ upon the top of the vacuum-chamber B and through branches $g^{31}$ $g^4$ to certain packing-boxes on the vacuum-chamber steam inlet and outlet gate-valves I I'.

The apparatus is operated in the main substantially as set forth in the patents hereinbefore referred to—that is to say, the vacuum-chamber steam gate-valves I I' being both closed a suitable quantity of steam is admitted through the pipe $f'$ and valve $f^2$ to the upper part of the vacuum-chamber B, the valve $f^2$ is closed, and the valve $g^3$ in the pipe $g^2$ is opened, admitting sufficient water to spray and condense the steam. The valve $g^3$ being closed as soon as a desired degree of vacuum is attained within the cylinder, the apparatus is now ready for the reception of the charge of spoil to be transferred. This is effected by dumping from the scow D, moored over the mouth $c$ of the suction-pipe C, more or less of the comparatively-compact material transported therein. The inlet-gate valve I being now opened, the partial vacuum within the vacuum-chamber B causes the commingled water and spoil to rush into and through the conduit C under atmospheric pressure. The vacuum-chamber B is emptied of the charge thus obtained by closing the inlet steam gate-valve I, opening the discharge-gate valve I', and ejecting the material through the discharge-conduit E by means of steam admitted to the top of the vacuum-chamber through the steam-valve $f^2$; but we have found that this operation of ejecting the spoil from the vacuum-cylinder by means of live steam directly in contact with the spoil is wasteful, in that much of the steam is condensed by the water mingled with the spoil and performs no useful function in the ejection of the latter, to which it simply imparts heat. We have, therefore, devised means for counteracting this tendency and economizing steam, the device consisting of a diaphragm L, resting loosely within the vacuum-cylinder B and preferably made of wood or other comparatively-light material, so as to float readily upon the top of the commingled water and spoil admitted to the said chamber. This floating disk L is either of somewhat less diameter than the interior of the cylinder or is also preferably formed with a few perforations $l$ $l$, the design being not to seal and divide the vacuum-chamber into two compartments by means of the disk L, but to lessen, as far as possible, the actual contact of the live steam with the surface of the liquid.

By making the diaphragm of less diameter than the interior of the vacuum-chamber and by perforating it we are enabled to separate the steam and water over nearly the entire area of the cylinder and at the same time leave sufficient space for the relief of pressure when necessary. Thus when owing to the presence of a comparatively-large proportion of water in the spoil the latter, by reason of the slight frictional resistance encountered in its passage through the suction-pipe c C, acquires a high velocity, it is desirable that the momentum be relieved or overcome gradually in order to avoid strain or even rupture of the parts. This we accomplish to a certain extent by providing for the escape of water around or through the disk L after the latter has been raised into contact with the lower sides of the steps or brackets $b^2$ $b^2$ at the upper end of the cylinder, as indicated by the dotted lines in Fig. 4; but where the spoil is very much diluted the space above such upper position of the diaphragm is insufficient to relieve and counteract the impetus of the rushing spoil, and therefore in order to provide against all possibilities of danger from this cause we form our vacuum-chamber with a relief-valve M, which opens and permits the escape of water should the internal pressure exceed a degree of safety to which the relief-valve is set. This relief-valve may be formed in any desired or well-known manner, and we do not confine ourselves to any special form or construction of valve, although that shown in the drawings indicates the essential features thereof. As shown, it consists of a cylindrical casing $m$, secured to the top of the compartment $b$ and closed at the upper end by a cap $m'$, through which an adjusting-screw $m^2$ projects. The lower end of the casing $m$ is formed with a valve-seat $m^3$ surrounding the opening $m^4$ into the compartment $b$. The valve N is pressed downward against its seat by a spring $n$, which is compressed more or less by the adjusting-screw $m^2$, which thus regulates the degree of resistance normally presented by the valve against internal pressure. It is desirable, however, to provide for a temporary increase of resistance against internal pressure under certain conditions, as when steam under pressure is admitted for the purpose of ejecting the charge of spoil. We therefore interpose between the adjusting-screw $m^2$ and the upper end of the spring $n$ a lever $n'$, pivotally connected at one end to the casing $m$ and extending out laterally from the other side of the casing a sufficient distance to afford ample leverage to compress the spring $n$ and hold down the valve N, when necessary, through the medium of a connecting-rod $n^2$ or equivalent. An overflow-pipe $m^5$ is provided to carry off escaping liquid. The upper end of the vacuum-chamber B is formed with the usual perforated screen O for spraying the water admitted to the compartment $b$, &c.

Where the spoil is considerably diluted there is not only danger of its entering the vacuum-chamber with undue violence unless controlled and relieved, as hereinbefore described, but in a similar manner and for a similar reason the forcible ejection of the spoil through the discharge-pipe is apt to create a recoil and a straining of parts that is dangerous. The vacuum-chamber inlet-steam gate I' is closed immediately upon the passage of the charge of spoil, which latter, moving at the velocity imparted to it in driving it out of the vacuum-chamber, creates a partial vacuum behind it and between it and the gate-valve I', so that when the charge of spoil is ejected from the mouth of the discharge-conduit E the air frequently rushes in with such violence as to derange or injure the apparatus. To overcome this serious defect in the operation of the apparatus we provide the discharge-pipe E with a device J or J' for automatically equalizing the pressure within the discharge-pipe. There are various means by which this may be accomplished, and in the accompanying drawings we show alternative forms, although we do not confine ourselves to either. Any device that will destroy or compensate for the partial vacuum created in the discharge-pipe by the ejection of the spoil will answer the purpose and will be within the spirit and intent of our invention in this respect.

In Figs. 1 and 2 a plain stand-pipe J' is interposed in the discharge-pipe E beyond the exit-gate valve I' of the vacuum-chamber B. This stand-pipe J' is made of sufficient height to compensate for and withstand the pressure exerted upon the discharge of the pump, and will hence compensate for and relieve the partial vacuum created in the discharge-pipe by the passage of the spoil after the exit-gate I' is closed. A screen or grating $j$ (shown in Fig. 7) is provided in the lower end of the stand-pipe J to exclude solid matter and admit water only from the spoil. The other method shown of effecting the relief sought consists in the use of a relief-valve J, interposed like the stand-pipe J' in the discharge-pipe E beyond the discharge-gate valve I'. This valve is shown in detail in Fig. 6, and consists of a section $j'$ of pipe connected with a T-joint in the discharge-pipe E, and is formed with an inwardly-opening flap-valve $j^2$, which is free to yield before an excess of external pressure and thus relieve any tendency to vacuum within the discharge-pipe E.

What we claim as our invention, and desire to secure by Letters Patent, is—

1. In an apparatus for transferring spoil, &c., the combination with a vacuum chamber, of a spoil-receiving suction pipe connected to the chamber, and a valve for releasing a portion of the charge of spoil admitted through said receiving pipe, thereby avoiding the effect of impact due to the momentum of the charge, substantially as described.

2. In apparatus for transferring spoil, &c., the combination with a vacuum chamber, of a spoil-receiving suction pipe connected therewith, a valve for releasing a portion of the charge of spoil and thereby relieving the apparatus from dangerous impact due to the momentum of the charge, and means for holding said valve in position during the discharge of the spoil, substantially as described.

3. In an apparatus for transferring spoil &c., the combination with a vacuum chamber, of a spoil-receiving suction pipe connected to the chamber, a valve for releasing a portion of the charge, and a disk or cover adapted to float upon the charge and to allow portions thereof to escape above the cover, substantially as described.

4. In apparatus for transferring spoil, &c., the combination with a vacuum chamber, of a discharge pipe connected with a vacuum chamber, and a vacuum relieving device connecting with the discharge pipe, whereby the vacuum caused by the rapid discharge of the spoil is automatically relieved, substantially as described.

5. In an apparatus for transferring spoil, &c., the combination with a vacuum chamber, of a spoil-receiving suction pipe connected to the chamber, a discharge pipe also connected to the chamber, a valve for releasing a portion of the charge of spoil from the vacuum chamber to avoid the effect of the impact due to the momentum of the charge on entering the chamber, and a vacuum relief device arranged in the discharge pipe for the purpose of relieving the vacuum caused by the rapid discharge of the charge of spoil, substantially as described.

CALEB G. COLLINS.
   ALBURTIS C. HILSINGER.
   CALVIN AMORY STEVENS.

Witnesses for Caleb G. Collins:
 GEORGE WILLIAM MIATT,
 EDITH MIATT.

Witnesses for Alburtis C. Hilsinger:
 HENRY E. WILSON,
 WATSON J. LYNDE.

Witnesses for Calvin Amory Stevens:
 GEORGE WILLIAM MIATT,
 EDITH MIATT.